US007555660B2

(12) United States Patent
Kamisuwa et al.

(10) Patent No.: US 7,555,660 B2
(45) Date of Patent: Jun. 30, 2009

(54) ELECTRIC-POWER MANAGEMENT OF AT LEAST ONE IMAGE FORMING APPARATUS TO CONTROL POWER CONSUMPTION OF A BUILDING

(75) Inventors: Yoshikatsu Kamisuwa, Tokyo (JP); Rintaro Nakane, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 492 days.

(21) Appl. No.: 11/421,436

(22) Filed: May 31, 2006

(65) Prior Publication Data

US 2007/0280708 A1 Dec. 6, 2007

(51) Int. Cl.
*G06F 1/26* (2006.01)

(52) U.S. Cl. ........................ 713/300; 700/295; 713/320

(58) Field of Classification Search ................ 358/1.14; 700/295; 713/300, 320, 340
See application file for complete search history.

(56) References Cited

U.S. PATENT DOCUMENTS

| | | | | |
|---|---|---|---|---|
| 7,265,852 | B2 * | 9/2007 | Goto et al. | 358/1.14 |
| 7,460,930 | B1 * | 12/2008 | Howell et al. | 700/295 |
| 2001/0010032 | A1 * | 7/2001 | Ehlers et al. | 702/62 |

FOREIGN PATENT DOCUMENTS

| | | |
|---|---|---|
| JP | 2002-292973 | 10/2002 |

* cited by examiner

*Primary Examiner*—Chun Cao
*Assistant Examiner*—Albert Wang
(74) *Attorney, Agent, or Firm*—SoCal IP Law Group LLP; Steven C. Sereboff; John E. Gunther

(57) ABSTRACT

Power consumption P of a building where plural image forming apparatuses 1 are installed is detected. When this detection result reaches an upper limit value Pa, power consumption of each of the image forming apparatuses 1 is reduced.

18 Claims, 6 Drawing Sheets

ELECTRIC-POWER MANAGEMENT OF AT LEAST ONE IMAGE FORMING APPARATUS TO CONTROL POWER CONSUMPTION OF A BUILDING

BACKGROUND OF THE INVENTION

A composite image forming apparatus (called an MFP) having plural functions, such as a copy function, a scan function and a print function, can copy an image of a document. Besides, this MFP can print image data transmitted from a network-connected external equipment, for example, a personal computer.

The power consumption of a building, for example, an office where such MFPs and personal computers are installed is very large. When the power consumption exceeds a rated value, a breaker of the office operates, and the supply of electric power to the MFPs and the personal computers is stopped.

BRIEF SUMMARY OF THE INVENTION

An object of an aspect of the invention is to provide an electric-power management system and a control method thereof in which the power consumption of a building where an image forming apparatus is installed can be limited to a previously determined upper limit value or less.

An electric-power management system according to an aspect of the invention includes at least one image forming apparatus, a power detection unit that detects one of power consumption and integral power consumption of a building where the image forming apparatus is installed, and a power management server that reduces power consumption of the image forming apparatus in a case where a detection result of the power detection unit reaches a previously determined upper limit value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] Hereinafter, a first embodiment of the invention will be described with reference to the drawings.

Figure 1:
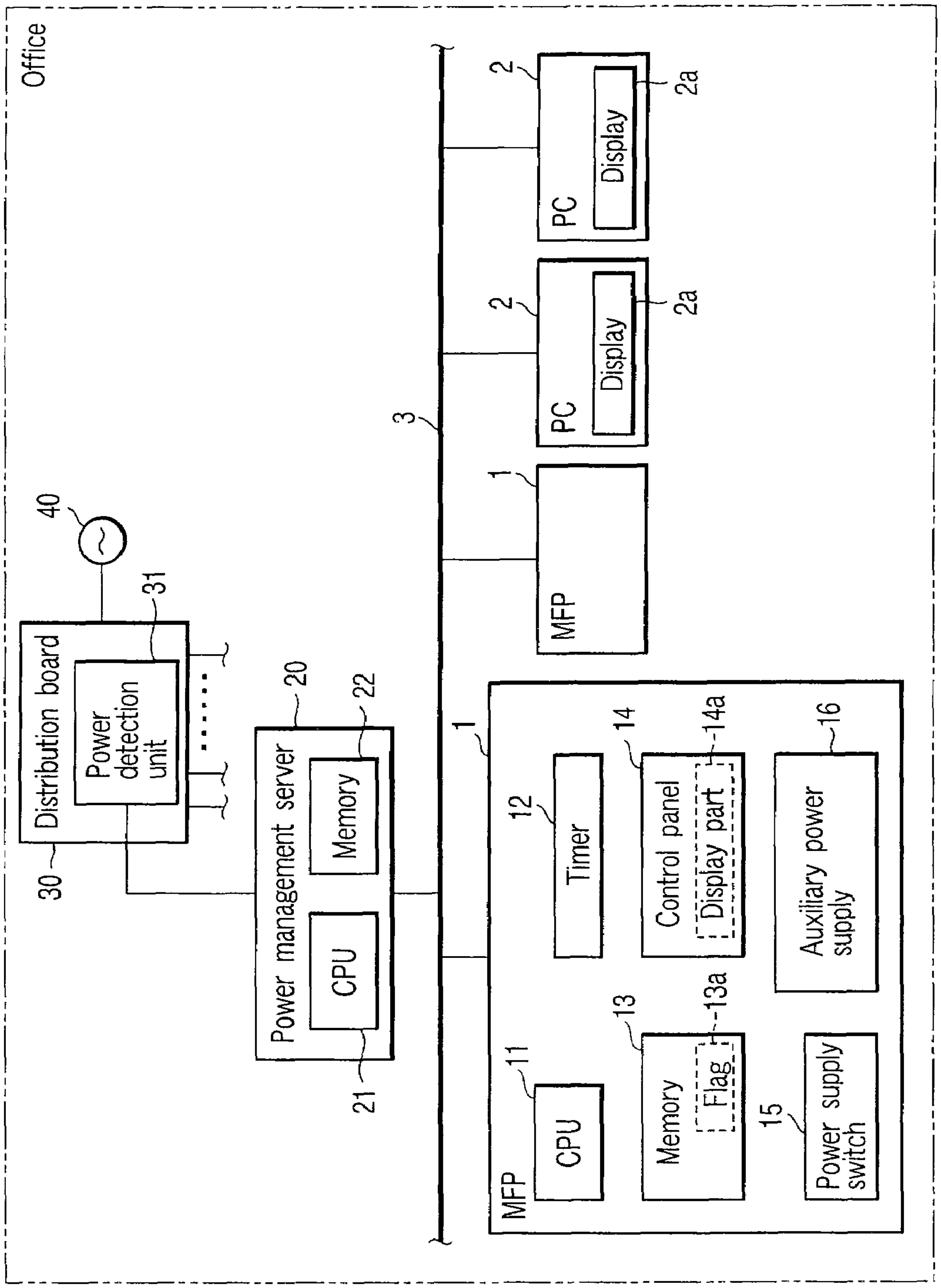
FIG. 1 is a view showing a structure in respective embodiments.

As shown in FIG. 1, plural image forming apparatuses (called MFPs) 1 and plural personal computers 2 are installed in an office in a building. These image forming apparatuses 1 and the personal computers 2 are connected to a power management server 20 through a network (for example, LAN) 3.

Each of the image forming apparatuses 1 is of a composite type having plural functions such as a copy function, a scan function and a print function, and includes a CPU 11, a timer 12, a memory 13, a control panel 14, a power supply switch 15, and an auxiliary power supply 16. These image forming apparatuses 1 can copy images of documents, and can print image data sent from the respective personal computers 2 through the network 3. The auxiliary power supply 16 is charged by a power supply circuit of the image forming apparatus 1, and can output the charged power as auxiliary power for the operation of the image forming apparatus 1.

Each of the personal computers 2 has a function to send image data prepared by a built-in operation program to one of the image forming apparatuses 1 and includes a display 2*a*.

The power management server 20 is connected through a signal line to a power detection unit 31 of a distribution board 30. The distribution board 30 is connected to a commercial AC power supply 40.

The distribution board 30 supplies AC voltage of the commercial AC power supply 40 to respective equipments in the office. The power detection unit 31 detects power consumption (total power consumption of the respective equipments) Po of the office. This detection result is supplied to the power management server 20.

The power management server 20 is for reducing power consumption P of each of the image forming apparatuses 1 in a case where the detection result Po of the power detection unit 31 reaches a previously determined upper limit value Pa, and includes a CPU 21 and a memory 22.

The CPU 21 has following (1) and (2) as main functions.

(1) A judgment section that judges whether or not the detection Po of the power detection unit 31 is the previously determined upper limit value Pa or higher, and whether or not the detection result Po of the power detection unit 31 is less than a specified value (=Pa−ΔP) lower than the upper limit value Pa by ΔP. The upper limit value Pa is stored in the memory 22.

(2) An instruction section that instructs each of the image forming apparatuses 1 to reduce the power in a case where the judgment result is the upper limit value Pa or higher and instructs each of the image forming apparatuses 1 to cancel the reduction in a case where the judgment result is less than the specified value (=Pa−ΔP).

Each of the image forming apparatuses 1 has a function to perform plural jobs, and has, as an operation mode, a normal power mode in which operation is performed at a normal power consumption and a power saving mode in which standby is performed at a power lower than the normal power consumption.

Besides, the CPU 11 of the image forming apparatus 1 has following (11) to (15) as main functions.

(11) A first control section that changes the operation mode from the normal power mode to the power saving mode in a case where a time of the standby reaches a previously determined set time ta. The set time ta is stored in the memory 13.

(12) A second control section that continues, in a case where the image forming apparatus 1 is performing an operation (job is being performed) when a reduction instruction is received from the power management server 20, the operation, and changes the operation mode from the normal power mode to the power saving mode after the operation is ended.

(13) A third control section that inhibits, when inhibition is set by a flag 13*a* in the memory 13 at a time of occurrence of a job, execution of the job and notifies the inhibition by a display. The flag 13*a* is for setting the inhibition of the job, and one of "on" and "off" is set according to an operation of the control panel 14. The "on" represents "inhibition", and the "off" represents "not inhibited". Incidentally, the display is performed on a display part 14*a* of the control panel 14 in the case of copying, and the display is performed on the display 2*a* of the personal computer 2 in the case of printing based on the transmission of image data from the personal computer 2.

(14) A fourth control section that suggests, when the inhibition is not set by the flag 13*a* at the time of occurrence of the job, cancellation or postponement of the job by a display. Incidentally, the display is performed by the display part 14*a* of the control panel 14 in the case of copying, and the display is performed by the display 2*a* of the personal computer 2 in the case of printing based on the transmission of image data from the personal computer 2.

(15) A fifth control section that performs, in a case where execution of the job is requested by an operation of the control panel 14 in spite of the suggestion, the job under a condition that the charging amount of the auxiliary power supply 16 is a specific amount or more and by using the power (discharge power) of the auxiliary power supply 16.

The operation will be described.

Figure 2:
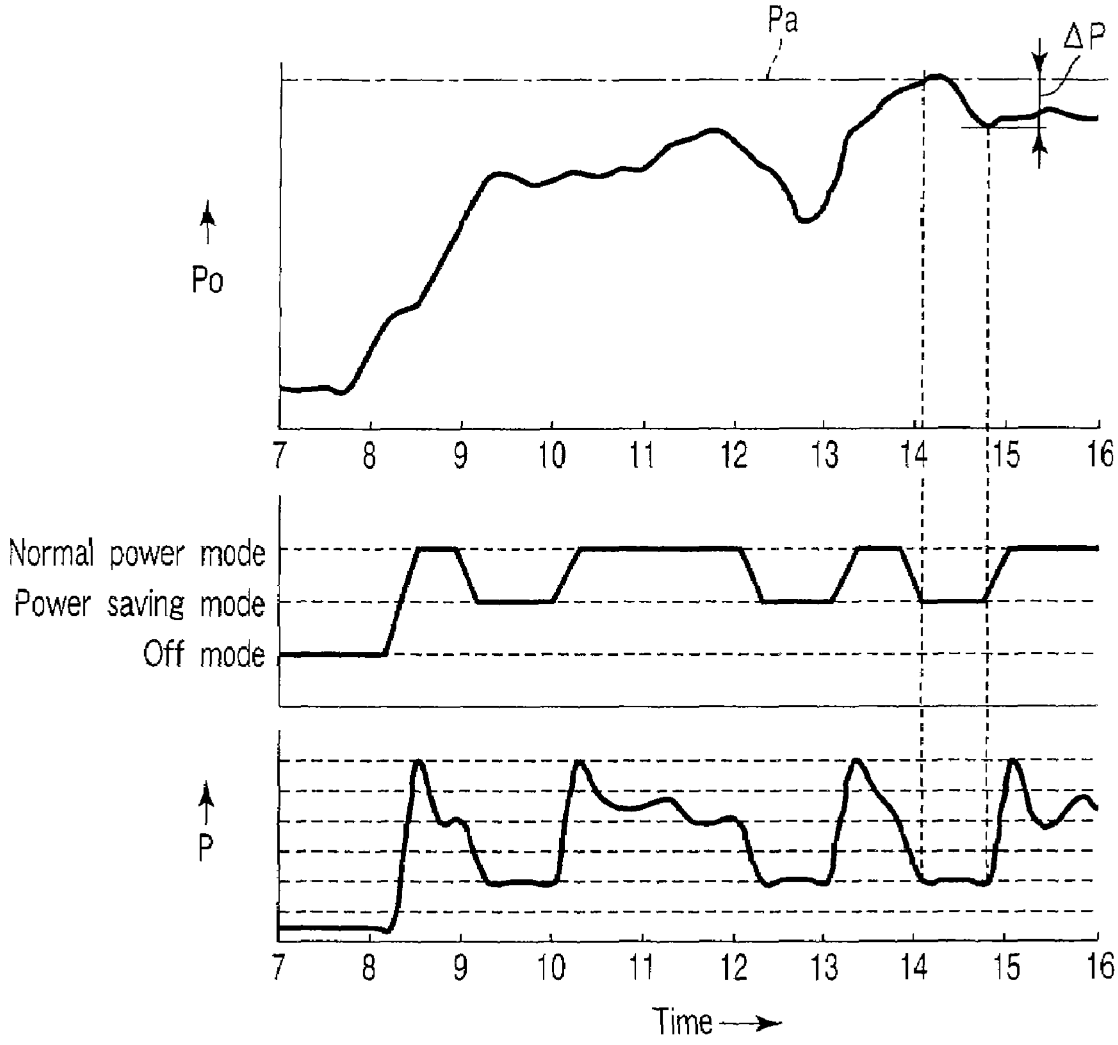
FIG. 2 is a view showing a change in power consumption and a change in operation mode in the respective embodiments.

FIG. 2 shows an example of a change in the power consumption P of the image forming apparatus 1 from morning to evening, a change in the power consumption Po of the office, and a change in the operation mode (normal power mode, power saving mode, off mode) of the image forming apparatus 1. The off mode is also called a FAX mode, and in the case where the power supply switch 15 is off, only the FAX function of the image forming apparatus 1 is made to operate.

Figure 3:
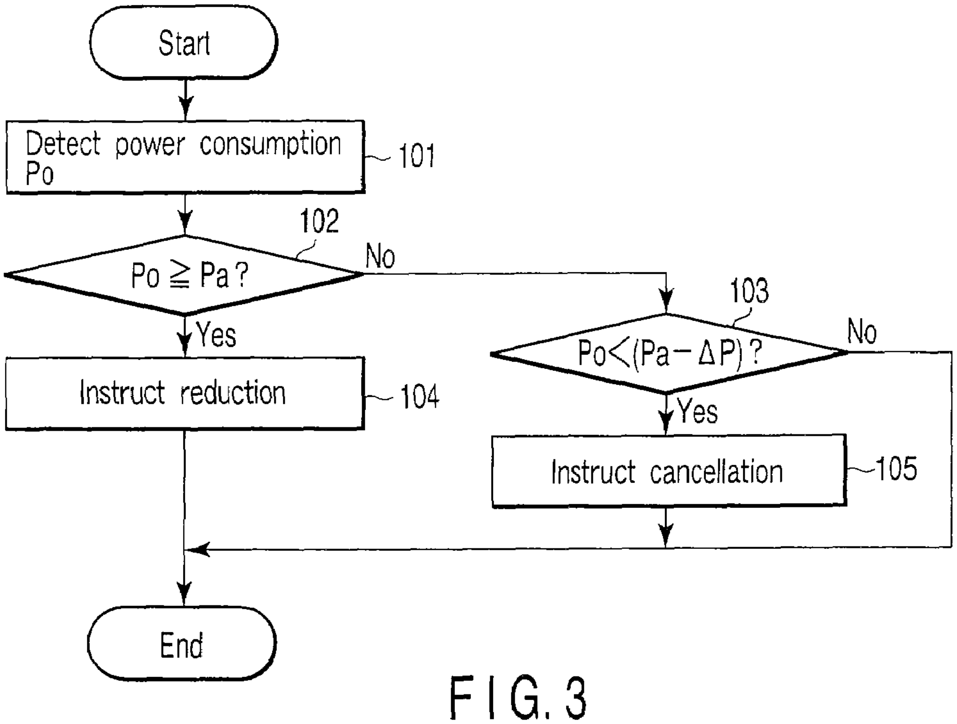
FIG. 3 is a flowchart for explaining the operation of a power detection unit and a power management server in a first and a second embodiments.
Figure 4:
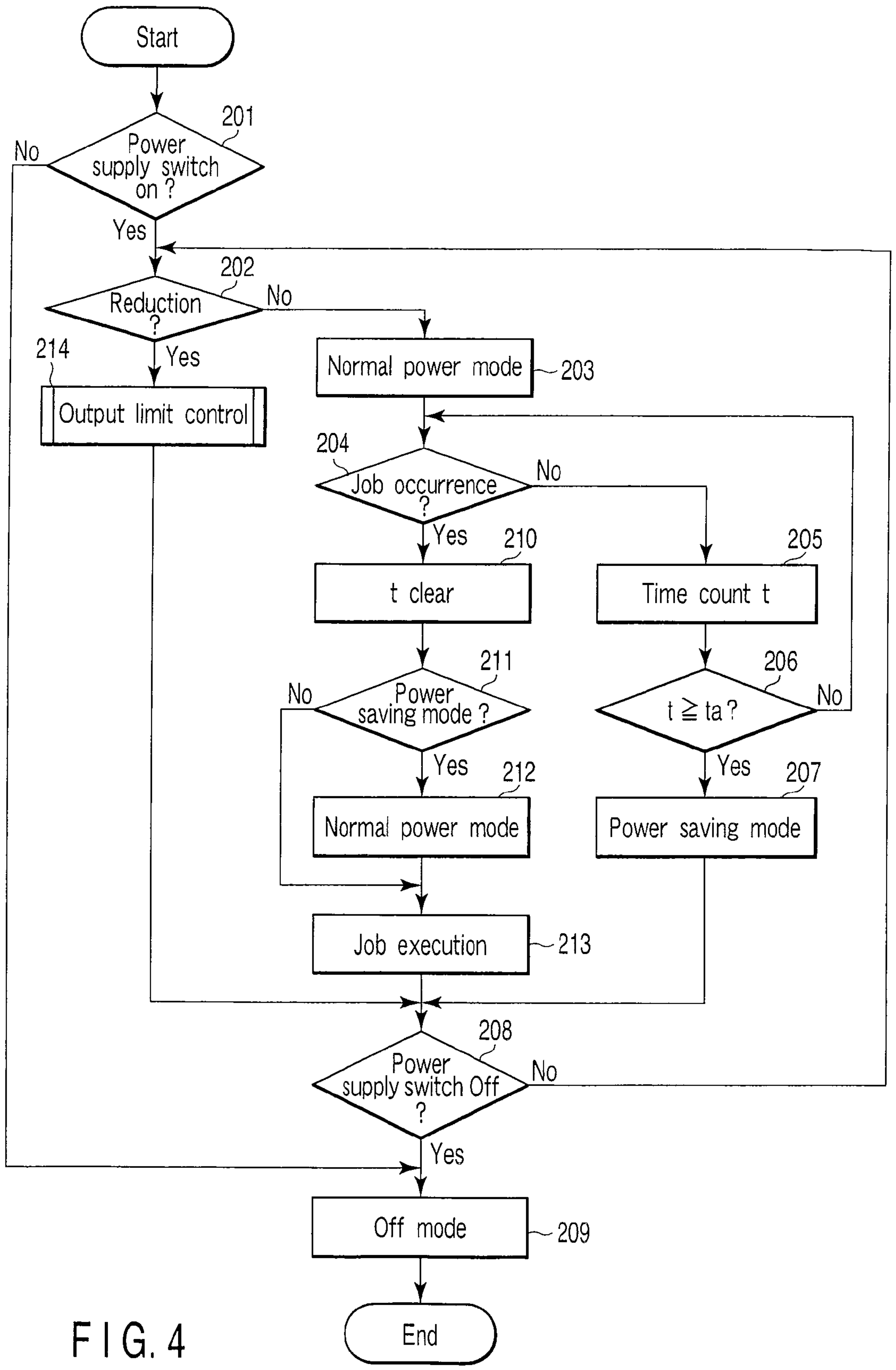
FIG. 4 is a flowchart for explaining the operation of an image forming apparatus in the respective embodiments.
Figure 5:
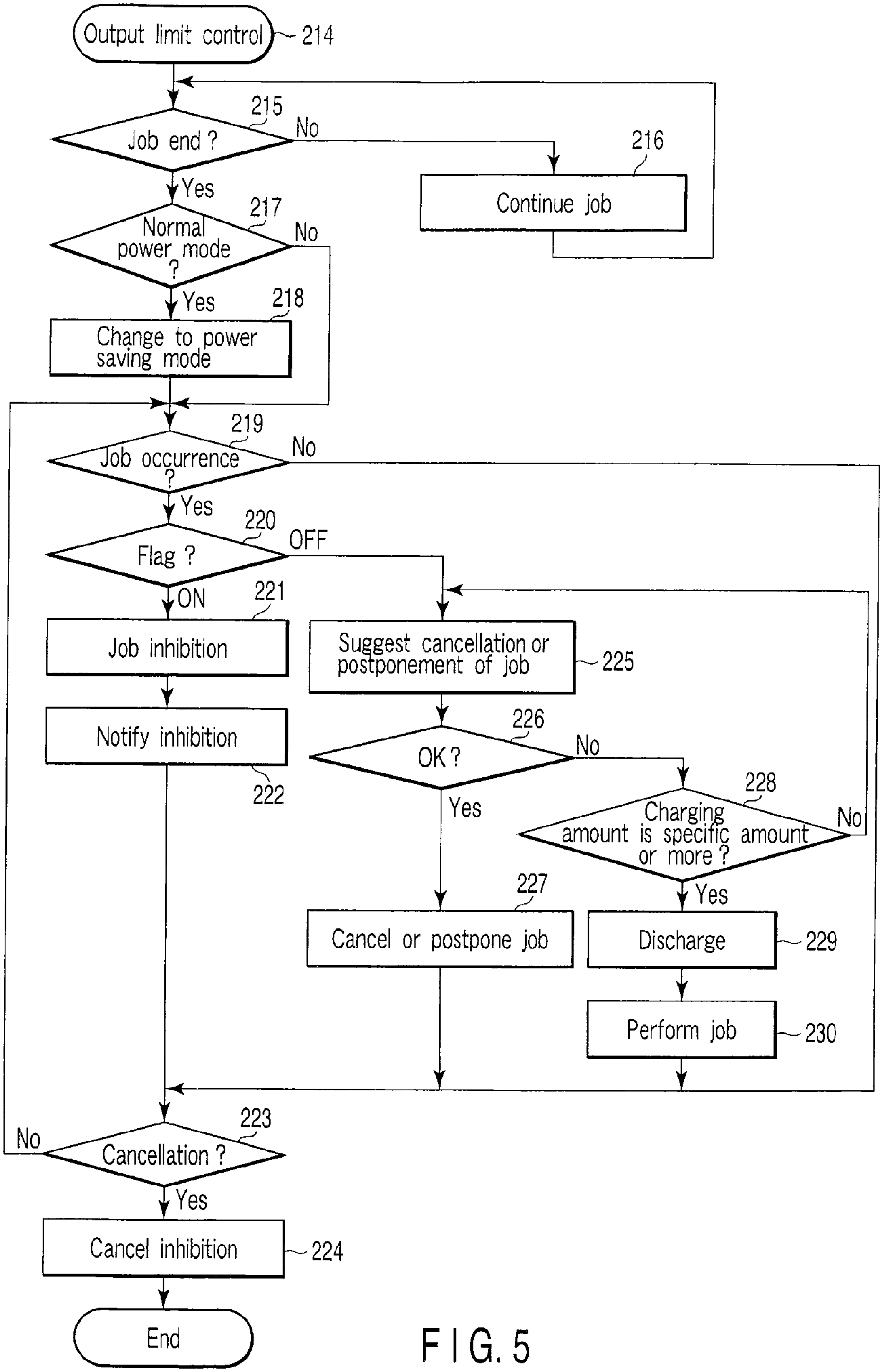
FIG. 5 is a flowchart showing an output limit control routine in FIG. 4.

The operation of the power detection unit 31 and the power management server 20 is shown in a flowchart of FIG. 3, and the operation of each of the image forming apparatuses 1 is shown in flowcharts of FIG. 4 and FIG. 5.

First, the power consumption P of the office is detected by the power detection unit 31 (YES at step 101). This detection result is supplied to the power management server 20.

In the power management server 20, it is judged whether or not the detection result P of the power detection unit 31 is the previously determined upper limit value Pa or more (step 102), and it is judged whether or not the detection result P of the power detection unit 31 is less than the specified value (=Pa−ΔP) lower than the upper limit value Pa by ΔP (step 103).

In the case where the detection result P is the upper limit value Pa or more (YES at step 102), each of the image forming apparatuses 1 is instructed to reduce the power (step 104). In the case where the detection result P is less than the specified value (=Pa−ΔP) (YES at step 103), each of the image forming apparatuses 1 is instructed to cancel the reduction (step 105).

In each of the image forming apparatuses 1, when the power supply switch 15 is turned on (YES at step 201), it is judged whether or not the reduction instruction is received from the power management server 20 (step 202). Unless the reduction instruction is received (NO at step 202), the normal power mode is set (step 203). Then, the occurrence of a job is monitored (step 204).

When there is no occurrence of the job (NO at step 204), a time count t by the timer 12 is performed (step 205). This time count t and a set time ta are compared with each other (step 206). When the time count t reaches the set time ta (YES at step 206), the normal power mode is changed to the power saving mode (step 207).

While the time count t does not reach the set time ta (NO at step 206), when some job occurs (YES at step 204), the time count t is cleared (step 210), and it is judged whether or not the power saving mode is set (step 211). When the power saving mode is set (YES at step 211), the power saving mode is changed to the normal power mode (step 212). Then, the job is performed (step 213).

When the power supply switch 15 is turned off (YES at step 208), the off mode is set (step 209).

On the other hand, the power consumption Po of the office reaches a peak in the daytime when the operating ratio of air conditioners and the like is high. In the example of FIG. 2, the power consumption Po reaches the upper limit value Pa at 2 pm or later. At this time, the power management server 20 instructs each of the image forming apparatuses 1 to reduce the power.

When the reduction instruction is received from the power management server 20 (NO at step 202), an output limit control is performed in each of the image forming apparatuses 1 (step 214). The output limit control is shown in a flowchart of FIG. 5.

That is, when the reduction instruction is received, in case the image forming apparatus 1 is performing some job (NO at step 215), the job is continued (step 216). When the job is ended (YES at step 215), the operation mode is judged (step 217). When the mode is the normal power mode (YES at step 217), it is changed to the power saving mode (step 218). When the mode is the power saving mode (NO at step 217), the power saving mode is kept as it is.

Since the normal power mode is kept during the execution of the job, the job can be certainly completed.

After the mode is changed to the power saving mode, when some job occurs (YES at step 219), the flag 13*a* in the memory 13 is confirmed (step 220). When the flag 13*a* is "on" (YES at step 220), it is judged that the inhibition is set, and the generated job is inhibited (step 221). With this inhibition, the inhibition is notified by a display (step 222). That is, when the job is the copying, the guiding sentence of the copy inhibition is displayed on the display part 14*a* of the control panel 14 of the image forming apparatus 1. When the job is the printing based on the transmission of image data from the personal computer 2, the guiding sentence of the copy inhibition is displayed on the display 2*a* of the personal computer 2.

As stated above, the power saving mode is set, and the job is inhibited, so that the power consumption P of the image forming apparatus 1 is reduced. Consequently, a rise in the power consumption Po of the office can be suppressed.

At the time of occurrence of the job (YES at step 219), when the flag 13*a* is "off" (NO at step 220), it is judged that the inhibition is not set, and the cancellation or postponement of the job is suggested by a display (step 225). That is, when the job is the copying, a guiding sentence to suggest the cancellation or postponement of the copying is displayed on the display part 14*a* of the control panel 14 of the image forming apparatus 1. When the job is the printing based on the transmission of image data from the personal computer 2, a guiding sentence to suggest the cancellation or postponement of the copying is displayed on the display 2*a* of the personal computer 2.

When, for example, a clear button of the control panel 14 is turned on in accordance with this suggestion, that is, when it is OK (YES at step 226), the job is cancelled or postponed (step 227).

However, when, for example, a start button of the control panel 14 is turned on, it is judged that the execution of the job is requested (NO at step 226), and it is judged whether or not the charging amount of the auxiliary power supply 16 is a specific amount or more (step 228). When the charging amount is the specific amount or more (YES at step 228), the auxiliary power supply 16 is discharged (step 229). This discharge power is used as the auxiliary power and the job is performed (step 230).

As stated above, even in the power saving mode, in the case where the job is required at any price, the job can be performed by using the discharge of the auxiliary power supply 16.

When the power consumption Po of the office is lowered to a value less than the specified value (=Pa−ΔP), the power management server 20 instructs each of the image forming apparatuses 1 to cancel the reduction.

When the cancellation instruction is received from the power management server 20 (YES at step 223), each of the image forming apparatuses 1 cancels the inhibition of the job (step 224).

By the above control, the power consumption Po of the building where the respective image forming apparatuses 1 and the respective personal computers 2 are installed is limited to the upper limit value Pa or less. By this, the actuation of a breaker of the office can be prevented, and an unnecessary stop of the respective image forming apparatuses 1 and the respective personal computers 2 can be avoided.

Figure 6:
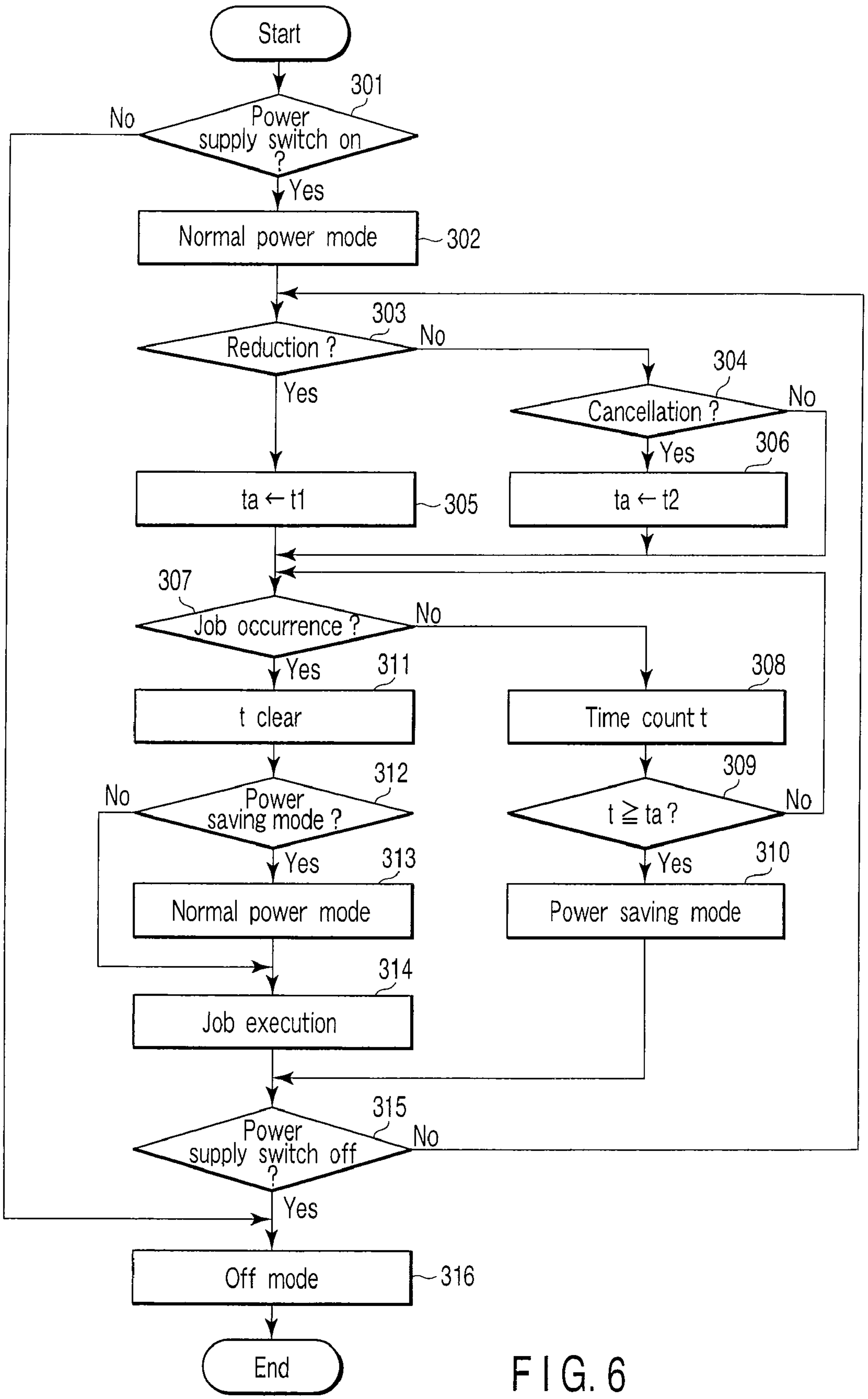
FIG. 6 is a flowchart for explaining the operation of the second embodiment.

[2] A second embodiment will be described with reference to a flowchart of FIG. 6.

The CPU 11 of each of the image forming apparatuses 1 has following (31) and (32) as main functions.

(31) A first control section that changes an operation mode from a normal power mode to a power saving mode in a case where a standby time reaches a previously determined set time ta. The set time ta is stored in the memory 13.

(32) A second control section that changes the set time ta to a time shorter than normal in a case where a reduction instruction is received.

In each of the image forming apparatuses 1, when the power supply switch 15 is turned on (YES at step 301), the normal power mode is set (step 302). Then, it is judged whether or not the reduction instruction or cancellation instruction is received from the power management server 20 (step 303, 304). When the reduction instruction is received (YES at step 303), t1 shorter than normal is set as the set time ta (step 305). When the cancellation instruction is received (YES at step 304), a normal time t2 (>t1) is set as the set time ta (step 306). Then, the occurrence of a job is monitored (step 307).

When there is no occurrence of the job (NO at step 307), a time count t by the timer 12 is performed (step 308). When the time count t reaches the set time ta (YES at step 309), the normal power mode is changed to the power saving mode (step 310).

While the time count t does not reach the set time ta (NO at step 309), when some job occurs (YES at step 307), the time count t is cleared (step 311), and it is judged whether or not the power saving mode is set (step 312). When the power saving mode is set (YES at step 312), the power saving mode is changed to the normal power mode (step 313). Then, the job is performed (step 314).

When the power supply switch 15 is turned off (YES at step 315), the off mode is set (step 316).

Incidentally, in the case where the reduction instruction is received from the power management server 20, an output limit control similar to that of the first embodiment may be performed.

As described above, in the case where the power consumption Po of the office reaches the upper limit value Pa, the time ta in which the normal power mode shifts to the power saving mode is changed to t1 shorter than the normal time t2, so that the power consumption Po of the building where the respective image forming apparatuses 1 and the respective personal computers 2 are installed is limited to the upper limit value Pa or less. By this, the actuation of a breaker of the office can be prevented, and an unnecessary stop of the respective image forming apparatuses 1 and the respective personal computers 2 can be avoided.

The other structure, operation and effect are the same as those of the first embodiment. Thus, their description will be omitted.

[3] A third embodiment will be described.

The CPU 21 of the power management server 20 has following (41), (42) and (43) as main functions.

(41) Integral power consumption Qs of the office is detected by integrating the detection result Po of the power detection unit 31 for a specific period, for example, in units of one month or in units of one year.

(42) A judgment section that judges whether or not the detected integral power consumption Qo is a previously determined upper limit value Qa or more, and judges whether or not the detected integral power consumption Qo is less than a specified value (=Qa−ΔQ) lower than the upper limit value Qa by ΔQ. The upper limit value Qa is stored in the memory 22.

(43) An instruction section that instructs each of the image forming apparatuses 1 to reduce power in a case where the judgment result is the upper limit value Qa or more, and instructs each of the image forming apparatuses 1 to cancel the reduction in a case where the judgment result is less than the specified value (=Qa−ΔQ).

The operation will be described.

Figure 7:
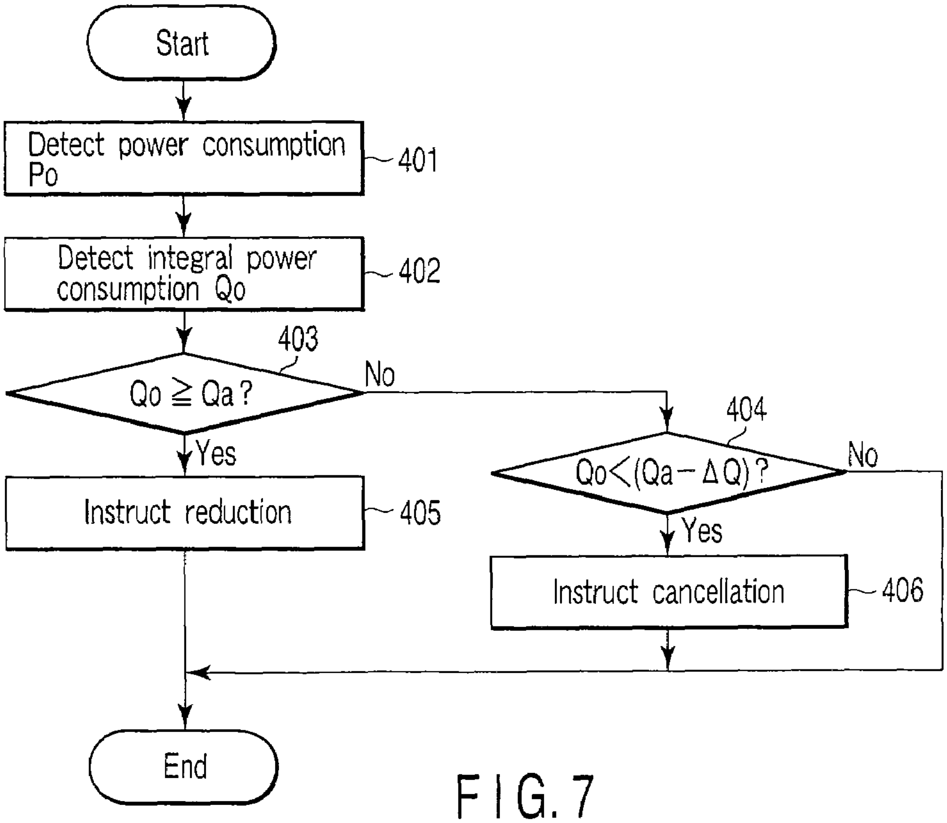
FIG. 7 is a flowchart for explaining the operation of a power detection unit and a power management server in a third embodiment.

The operation of the power detection unit 31 and the power management server 20 is shown in a flowchart of FIG. 7.

The power consumption P of the office is detected by the power detection unit 31 (YES at step 401). This detection result is supplied to the power management server 20.

In the power management server 20, the detected power consumption P is integrated in units of one month or in units of one year, and the integral power consumption Qo of the office is detected (step 402).

Then, it is judged whether or not the detected integral power consumption Qo is the upper limit value Qa or more (step 403), and it is judged whether or not the detected integral power consumption Qo is less than a specified value (=Qa−ΔQ) (step 404).

In the case where the integral power consumption Qo is the upper limit value Qa or more (YES at step 403), each of the image forming apparatuses 1 is instructed to reduce the power (step 405). In the case where the integral power consumption Qo is less than the specified value (=Qa−ΔQ) (YES at step 404), each of the image forming apparatuses 1 is instructed to cancel the reduction (step 406).

The other structure, operation and effect are the same as those of the first embodiment or the second embodiment. Thus, their description will be omitted.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An electric-power management system comprising:

at least one image forming apparatus, wherein the image forming apparatus has, as an operation mode, a normal power mode in which operation is performed at a normal power consumption and a power saving mode in which standby is performed at a power lower than the normal power consumption;

a power detection unit that detects one of power consumption and integral power consumption of a building where the image forming apparatus is installed; and a power management server that reduces power consumption of the image forming apparatus in a case where a detection result of the power detection unit reaches a previously determined upper limit value, wherein the power management server includes:

a judgment section that judges whether the detection result of the power detection unit is the upper limit value or more; and an instruction section that instructs the image forming apparatus to reduce the power in a case where the judgment result of the judgment section is the upper limit value or more; and the image forming apparatus includes:

a first control section that changes the operation mode from the normal power mode to the power saving mode in a case where a time of the standby reaches a previously determined set time; and a second control section that changes the operation mode from the normal power mode to the power saving mode in a case where a reduction instruction is received from the instruction section.

2. The system according to claim 1, wherein the image forming apparatus is network-connected to the power management server.

3. The system according to claim 1, wherein the second control section continues, in case the image forming apparatus is performing an operation at a time when the reduction instruction is received from the instruction section, the operation, and changes the operation mode from the normal power operation mode to the power saving standby mode after the operation is ended.

4. The system according to claim 1, further comprising the image forming apparatus includes an auxiliary power supply capable of charging/discharging.

5. An electric-power management system comprising:

at least one image forming apparatus, wherein the image forming apparatus has a function to perform plural jobs and has, as an operation mode, a normal power mode in which operation is performed at a normal power consumption and a power saving mode in which standby is performed at a power lower than the normal power consumption;

a power detection unit that detects one of power consumption and integral power consumption of a building where the image forming apparatus is installed; and a power management server that reduces power consumption of the image forming apparatus in a case where a detection result of the power detection unit reaches a previously determined upper limit value, wherein the power management server includes:

a judgment section that judges whether the detection result of the power detection unit is the upper limit value or more; and an instruction section that instructs the image forming apparatus to reduce the power in a case where the judgment result of the judgment section is the upper limit value or more; and the image forming apparatus includes:

a first control section that changes the operation mode from the normal power mode to the power saving mode in a case where a time of the standby reaches a previously determined set time;

a second control section that changes the operation mode from the normal power mode to the power saving mode in a case where a reduction instruction is received from the instruction section;

a flag that sets inhibition of the job;

a third control section that inhibits, when inhibition is set by the flag at a time of occurrence of the job, execution of the job and notifies the inhibition by a display; and a fourth control section that suggests, when the inhibition is not set by the flag at the time of occurrence of the job, cancellation or postponement of the job.

6. The system according to claim 5, wherein the second control section continues, in case the image forming apparatus is performing an operation at a time when the reduction instruction is received from the instruction section, the operation, and changes the operation mode from the normal power operation mode to the power saving standby mode after the operation is ended.

7. An electric-power management system comprising:

at least one image forming apparatus, wherein the image forming apparatus has a function to perform plural jobs, and has, as an operation mode, a normal power mode in which operation is performed at a normal power consumption and a power saving mode in which standby is performed at a power lower than the normal power consumption;

a power detection unit that detects one of power consumption and integral power consumption of a building where the image forming apparatus is installed; and a power management server that reduces power consumption of the image forming apparatus in a case where a detection result of the power detection unit reaches a previously determined upper limit value, wherein the power management server includes:

a judgment section that judges whether the detection result of the power detection unit is the upper limit value or more, and judges whether the detection result of the power detection unit is less than a specified value lower than the upper limit value; and an instruction section that instructs the image forming apparatus to reduce the power in a case where the judgment result of the judgment section is the upper limit value or more, and instructs the image forming apparatus to cancel the reduction in a case where the judgment result of the judgment section is less than the specified value, and the image forming apparatus includes:

a first control section that changes the operation mode from the normal power mode to the power saving mode in a case where a time of the standby reaches a previously determined set time;

a second control section that changes the operation mode from the normal power mode to the power saving mode in a case where a reduction instruction is received from the instruction section;

a flag that sets inhibition of the job;

a third control section that inhibits, when inhibition is set by the flag at a time of occurrence of the job, execution of the job and notifies the inhibition by a display, and cancels the inhibition in a case where a cancellation instruction is received from the instruction section; and a fourth control section that suggests, when the inhibition is not set by the flag at the time of occurrence of the job, cancellation or postponement of the job by a display.

8. The system according to claim 7, wherein the second control section continues, in case the image forming apparatus is performing an operation at the time when the instruction of the instruction section is received, the operation, and changes the operation mode from the normal power operation mode to the power saving standby mode after the operation is ended.

9. An electric-power management system comprising:

at least one image forming apparatus, wherein the image forming apparatus has, as an operation mode, a normal power mode in which operation is performed at a normal power consumption, and a power saving mode in which standby is performed at a power lower than the normal power consumption;

a power detection unit that detects one of power consumption and integral power consumption of a building where the image forming apparatus is installed; and a power management server that reduces power consumption of the image forming apparatus in a case where a detection result of the power detection unit reaches a previously determined upper limit value, wherein the power management server includes:

a judgment section that judges whether the detection result of the power detection unit is the upper limit value or more; and an instruction section that instructs the image forming apparatus to reduce the power in a case where the judgment result of the judgment section is the upper limit value or more, and the image forming apparatus includes:

a first control section that changes the operation mode from the normal power mode to the power saving mode in a case where a time of the standby reaches a previously determined set time; and a second control section that changes the set time to a time shorter than a normal one in a case where a reduction instruction is received from the instruction section.

10. An electric-power management system comprising:

at least one image forming apparatus, wherein the image forming apparatus has, as an operation mode, a normal power mode in which operation is performed at a normal power consumption and a power saving mode in which standby is performed at a power lower than the normal power consumption;

power detection means for detecting one of power consumption and integral power consumption of a building where the image forming apparatus is installed; and power management means for reducing power consumption of the image forming apparatus in a case where a detection result of the power detection means reaches a previously determined upper limit value, wherein the power management means includes:

judgment means for judging whether the detection result of the power detection unit is the upper limit value or more, and instruction means for instructing the image forming apparatus to reduce the power in a case where the judgment result of the judgment means is the upper limit value or more; and wherein the image forming apparatus includes:

first control means for changing the operation mode from the normal power mode to the power saving mode in a case where a time of the standby reaches a previously determined set time; and second control means for changing the operation mode from the normal power mode to the power saving mode in a case where a reduction instruction is received from the instruction means.

11. The system according to claim 10, wherein the image forming apparatus is network-connected to the power management means.

12. The system according to claim 10 wherein the second control means continues, in case the image forming apparatus is performing an operation at a time when the reduction instruction is received from the instruction means, the operation, and changes the operation mode from the normal power operation mode to the power saving standby mode after the operation is ended.

13. The system according to claim 10, further comprising the image forming apparatus includes an auxiliary power supply capable of charging/discharging.

14. An electric-power management system comprising:

at least one image forming apparatus, wherein the image forming apparatus has a function to perform plural jobs and has, as an operation mode, a normal power mode in which operation is performed at a normal power consumption and a power saving mode in which standby is performed at a power lower than the normal power consumption;

power detection means for detecting one of power consumption and integral power consumption of a building where the image forming apparatus is installed; and power management means for reducing power consumption of the image forming apparatus in a case where a detection result of the power detection means reaches a previously determined upper limit value, wherein the power management means includes:

judgment means for judging whether the detection result of the power detection unit is the upper limit value or more; and instruction means for instructing the image forming apparatus to reduce the power in a case where the judgment result of the judgment means is the upper limit value or more, and the image forming apparatus includes:

first control means for changing the operation mode from the normal power mode to the power saving mode in a case where a time of the standby reaches a previously determined set time;

second control means for changing the operation mode from the normal power mode to the power saving mode in a case where a reduction instruction is received from the instruction means;

a flag for setting inhibition of the job;

third control means for inhibiting, when inhibition is set by the flag at a time of occurrence of the job, execution of the job and notifies the inhibition by a display; and fourth control means for suggesting, when the inhibition is not set by the flag at the time of occurrence of the job, cancellation or postponement of the job.

15. The system according to claim 14, wherein the second control means continues, in case the image forming apparatus is performing an operation at a time when the reduction instruction is received from the instruction means, the operation, and changes the operation mode from the normal power operation mode to the power saving standby mode after the operation is ended.

16. An electric-power management system comprising:

at least one image forming apparatus, wherein the image forming apparatus has a function to perform plural jobs, and has, as an operation mode, a normal power mode in which operation is performed at a normal power consumption and a power saving mode in which standby is performed at a power lower than the normal power consumption;

power detection means for detecting one of power consumption and integral power consumption of a building where the image forming apparatus is installed; and power management means for reducing power consumption of the image forming apparatus in a case where a detection result of the power detection means reaches a previously determined upper limit value, wherein the power management means includes:

judgment means for judging whether the detection result of the power detection means is the upper limit value or more, and judges whether the detection result of the power detection means is less than a specified value lower than the upper limit value; and instruction means for instructing the image forming apparatus to reduce the power in a case where the judgment result of the judgment means is the upper limit value or more, and instructing the image forming apparatus to cancel the reduction in a case where the judgment result of the judgment means is less than the specified value, and the image forming apparatus includes:

first control means for changing the operation mode from the normal power mode to the power saving mode in a case where a time of the standby reaches a previously determined set time;

second control means for changing the operation mode from the normal power mode to the power saving mode in a case where a reduction instruction is received from the instruction means;

a flag for setting inhibition of the job;

third control means for inhibiting, when inhibition is set by the flag at a time of occurrence of the job, execution of the job and notifying the inhibition by a display, and canceling the inhibition in a case where a cancellation instruction is received from the instruction section; and fourth control means for suggesting, when the inhibition is not set by the flag at the time of occurrence of the job, cancellation or postponement of the job by a display.

17. The system according to claim 16, wherein the second control means continues, in case the image forming apparatus is performing an operation at a time when the instruction of the instruction means is received, the operation, and changes the operation mode from the normal power operation mode to the power saving standby mode after the operation is ended.

18. An electric-power management system comprising:

at least one image forming apparatus, wherein the image forming apparatus has, as an operation mode, a normal power mode in which operation is performed at a normal power consumption, and a power saving mode in which standby is performed at a power lower than the normal power consumption;

power detection means for detecting one of power consumption and integral power consumption of a building where the image forming apparatus is installed; and power management means for reducing power consumption of the image forming apparatus in a case where a detection result of the power detection means reaches a previously determined upper limit value, wherein the power management means includes:

judgment means for judging whether the detection result of the power detection means is the upper limit value or more; and instruction means for instructing the image forming apparatus to reduce the power in a case where the judgment result of the judgment means is the upper limit value or more, and the image forming apparatus includes:

first control means for changing the operation mode from the normal power mode to the power saving mode in a case where a time of the standby reaches a previously determined set time; and second control means for changing the set time to a time shorter than a normal one in a case where a reduction instruction is received from the instruction means.

* * * * *